A. PETELER.
SHOCK ABSORBER.
APPLICATION FILED NOV. 26, 1912.
1,057,452.
Patented Apr. 1, 1913.
2 SHEETS—SHEET 1.
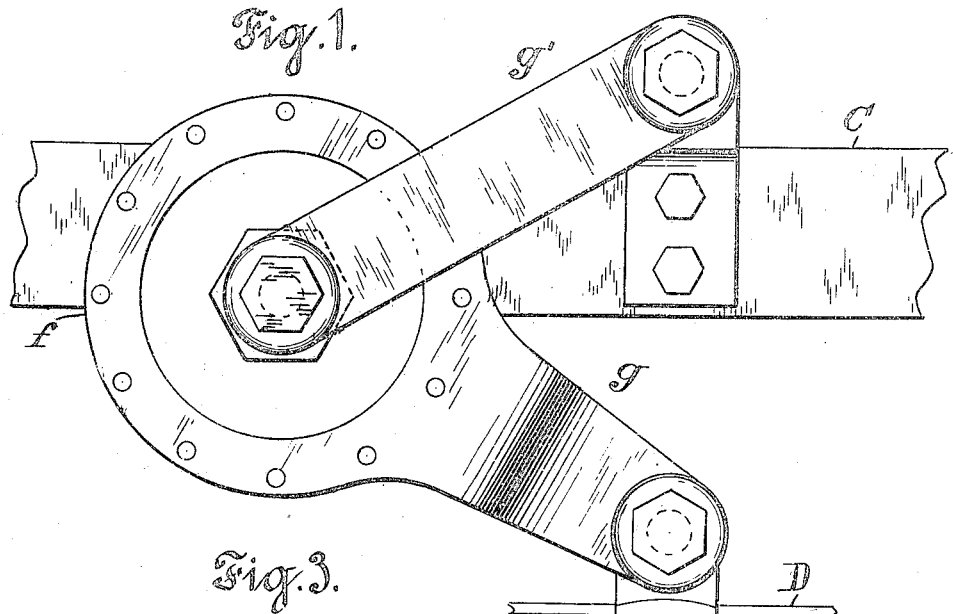
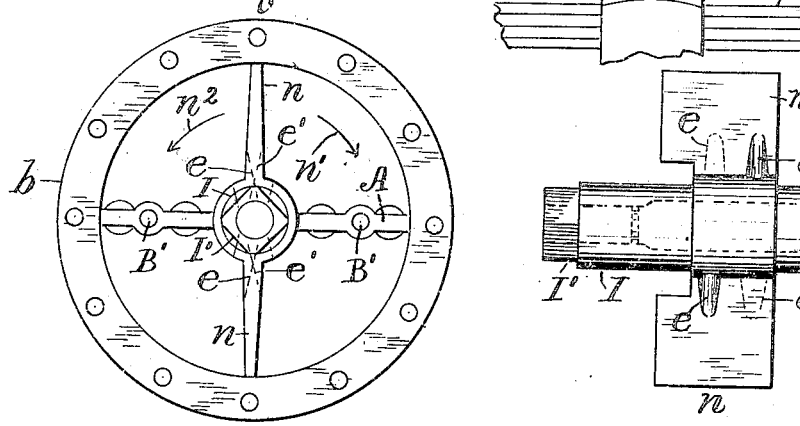
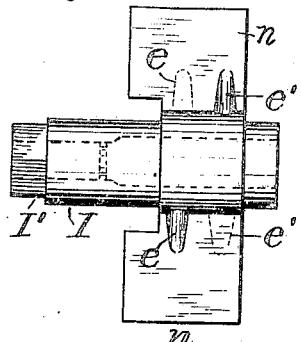
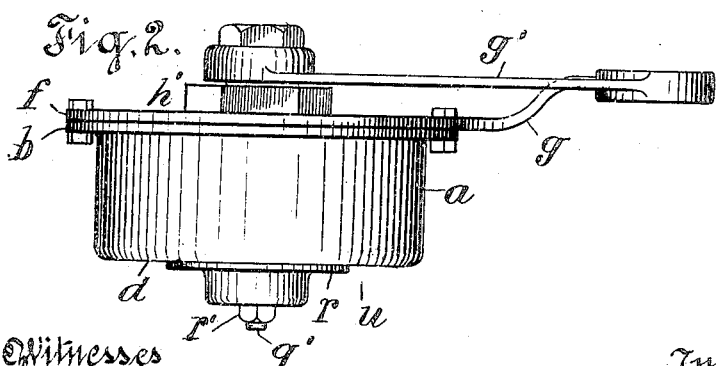
Inventor
Adolph Peteler, per
Thomas S. Crane, Atty.

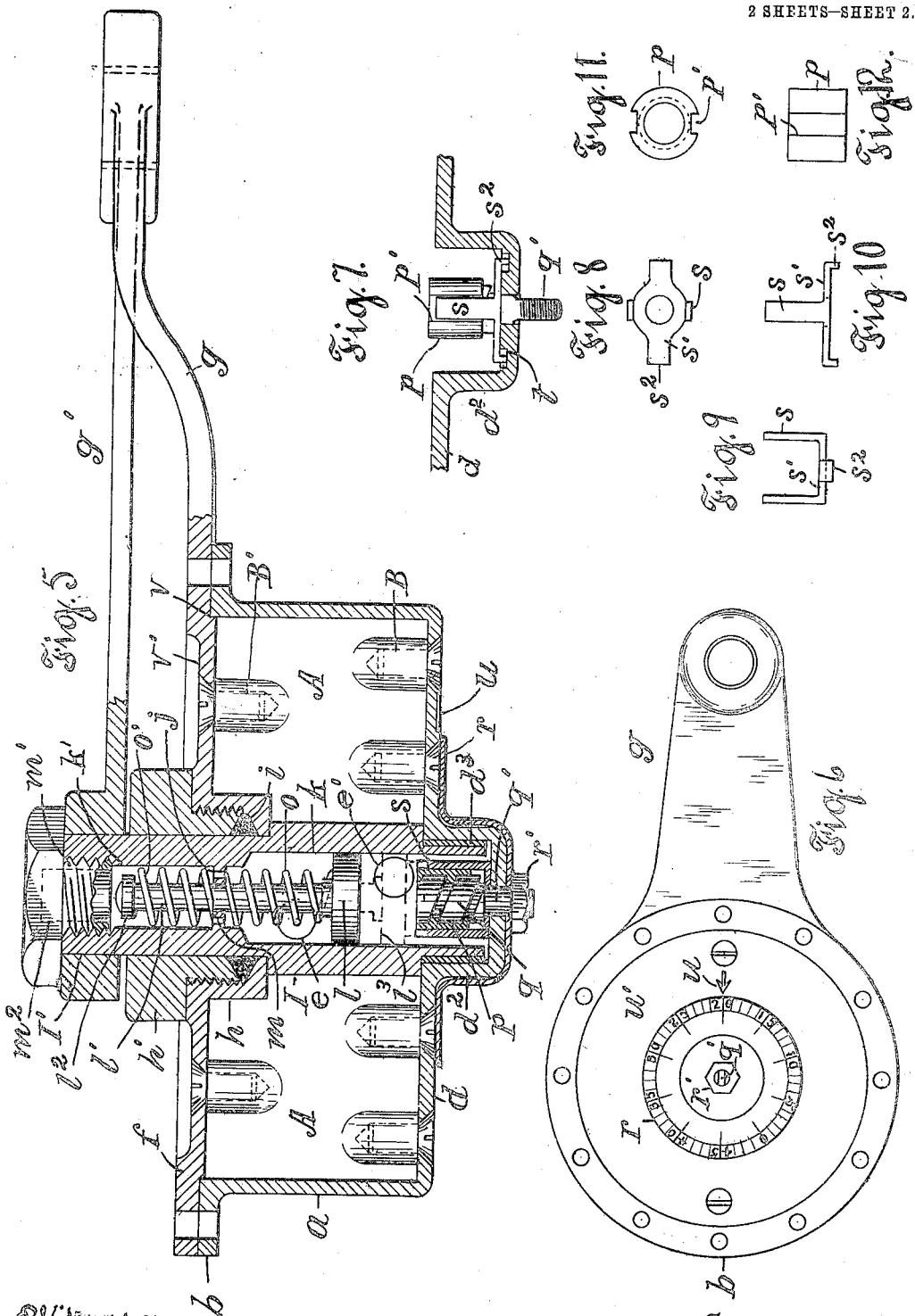

UNITED STATES PATENT OFFICE.

ADOLPH PETELER, OF NEW YORK, N. Y.

SHOCK-ABSORBER.

1,057,452.

Specification of Letters Patent.   Patented Apr. 1, 1913.

Application filed November 26, 1912. Serial No. 733,594.

*To all whom it may concern:*

Be it known that I, ADOLPH PETELER, a citizen of the United States, residing at 330 West Seventieth street, New York, county of New York, and State of New York, have invented certain new and useful Improvements in Shock-Absorbers, fully described and represented in the following specification and accompanying drawings, forming a part of the same.

The present invention relates to a shock absorber having one arm attached to the chassis of a vehicle upon which a body is carried by vehicle-springs, and the other arm attached to such body.

It is especially desirable that such shock absorbers should control the upward movements of the vehicle-body, which occur in its reaction whenever the springs supporting the body have been compressed by a sudden jolt of the chassis; and the object of the present invention is to furnish a simple construction to accomplish this result.

It is also desirable that a shock absorber should, without any resistance, permit free oscillation of the body upon the chassis when traveling over ordinarily smooth roads, and the present invention furnishes a shock absorber which permits such oscillations within a certain limit, but operates automatically, if the oscillations exceed such limit, to check and control them.

The construction will be understood by reference to the annexed drawings, in which—

Figure 1 is an elevation of the shock absorber and its attachments to the vehicle; Fig. 2 is an edge view of the absorber; Fig. 3 is a plan of the casing with the cover removed; Fig. 4 is a side elevation of the spindle and wings; Fig. 5 is a longitudinal central section of the absorber; Fig. 6 shows the under side of the absorber; Fig 7 shows the central part of the casing-head, the view being taken at right angles to that in Fig. 5; Fig. 8 is a plan, Fig. 9 an end view, and Fig. 10 a side view of the guides for the regulator-block. Figs. 11 and 12 are a plan and side view of the regulator-block.

The casing of the absorber is formed of two parts of sheet-metal stamped in the desired shape, the body having a cylinder $a$ with flange $b$ at one end and an integral bottom $d$ at the opposite end with a cylindrical bearing-socket $d^2$ pressed outwardly from the center of the bottom to form a bearing for the bottom of the spindle.

The cover is formed of a circular plate $f$ having an integral arm $g$ extended therefrom and having a cylindrical bearing-socket $h$ stamped inwardly at the center to form a stuffing-box and bearing-socket $h$ for the spindle I. The socket $h$ is threaded, and a threaded gland and bearing $h'$ is fitted thereto to retain a packing $i$ therein.

The socket-bearing $d^2$ is shown provided with an anti-friction bushing $d^3$, and the spindle is formed with reduced ends fitted respectively to the said bushing and to the stuffing-box, and has a squared end $I'$ projected outwardly from the stuffing-box to receive the hub of an arm $g'$. The spindle has a bore $k$ at the inner end to receive a piston $l$, and a bore $k'$ at its outer end to receive the stem $l'$ of the piston. A partition $j$ is formed in the spindle between the two bores and perforated for the passage of the piston-stem $l'$, and has also some passage-holes $m$ at the sides of the stem. The outer end of the bore $k'$ is closed by a screw-plug $m'$, the head of which serves to hold the hub of the arm $g'$ upon the squared end $I'$ of the spindle. The screw-plug is formed with a central recess $m^2$ into which the stem $l'$ may move when necessary, the holes $m$ permitting the fluid to move into and out of the bore $k'$ during such movements of the stem. Abutments A are fitted within the casing at opposite sides of the spindle, and are secured in place by screws B extended through the casing-head $d$ and screws $B'$ extended through the cover $f$.

The vehicle-body C and truck-frame D are indicated in Fig. 1 with the two arms of the absorber jointed thereto. The spindle has wings $n$ at opposite sides to vibrate between the abutments, and two ports $e$ and $e'$ are extended from the bore outwardly at different points in its length upon opposite sides of each wing. The casing is filled with liquid as usual, the resistance of which to the movement of the wings is regulated by the piston in the manner hereinafter described. A washer $l^2$ is riveted upon the end of the piston-stem $l'$, and springs $o$ and $o'$ are fitted to the stem at opposite sides of the partition $j$ and operate to hold the piston $l$ normally in a position intermediate the ports $e$, $e'$. The springs are made to offer only a normal resistance to the movement of the piston, and may be proportioned to hold the piston normally at any point between the two ports. The port $e$ at one side of each wing receives the fluid pressed by the wings against the abutments, and operates upon the upper side of the piston to force it toward the ports $e'$. The piston moves freely under such pressure until arrested by the regulator to be hereinafter described, which arrests its motion in some position over the ports $e'$. When it opens the side of the ports $e'$ nearest to the ports $e$, as indicated by the dotted position $l^3$ of the piston in Fig. 5, it affords a passage of certain area for the fluid from the ports $e$ through the ports $e'$, to the opposite side of the wing. If the passage be of small area it furnishes a great resistance to the movement of the wings, and if of larger area it furnishes a lesser resistance; and by adjusting the arrest of the piston it may furnish exactly the resistance desired to the movements of the shock absorber. This is effected by the regulator-block $p$ which is mounted in the center of the bearing-socket $d^2$ within the bore $k$ and has an internal thread to fit a screw $q$ which has a shank $q'$ projected outwardly through the casing and flattened upon its outer end, as shown in Fig. 7. A shoulder on the shank fits inside the foot $s'$. The regulator-block can be moved by the screw adjacent to the ports $e'$, and determine the degree to which the piston $l$ may move and uncover such ports. An index dial $r$ is shaped to fit loosely around the exterior of the bearing-socket $d^2$ and bears upon the outer side of the casing-head $d$, and is fitted to the flattened portion of the shank so as to turn therewith. A nut $r'$ is fitted to the threaded portion of the shank and operates, when tightened, to clamp the dial and the screw both rigidly in any adjusted position.

The block $p$ has grooves $p'$ upon opposite sides, as shown in Fig. 11, and a guide is fitted to the bottom of the bearing-socket and formed with posts $s$ to which the grooves of the block are fitted movably. The guide has a foot $s'$ with tongues $s^2$ fitted to holes $t$ at the end of the bearing-socket, which keep the guide from turning therein. The shoulder between the screw $q$ and its shank $q'$ holds the foot of the guide downward to the end of the bearing-socket. An indicator $u$ shown as an arrow-head in Fig. 6, is fixed upon the casing-head $d$ adjacent the edge of the dial, and the dial is formed with numbered graduations $u'$ by which it can be adjusted in connection with the index $u$, thus turning the screw and forcing the regulator-block more or less toward the port $e'$.

The operation of the absorber is as follows: A jolt of the truck-frame D forces the arms $g$ and $g'$ together and pushes the wings $n$ toward the abutments, as indicated by the arrow $n'$ in Fig. 3, such movement forcing liquid into the ports $e'$ beneath the piston and forcing the piston upwardly toward or past the ports $e$, and the reaction of the vehicle-body in which the vehicle-springs force it away from the truck D, pushes the wings in the opposite direction as shown by the arrows $n^2$, and forces the liquid into the upper ports $e$. If the jolting movement be slight, the oscillation of the wings is slight, and the piston merely vibrated back and forth between the ports $e$ and $e'$. If the momentum be sufficiently great, the fluid entering the ports $e'$ forces the piston upwardly past the ports $e$ and permits the fluid to escape through such port to the opposite side of the wing. As the spring-resistance of the piston is nominal, the movement of the wings in the direction of the arrow $n'$ is effected without any resistance, and the reverse movement of the piston during the reaction is also without resistance until the piston-movement is arrested by the regulator-block. The piston is not arrested until it has moved over the ports $e'$ and exposed a portion of its upper area for the passage of the fluid from the ports $e$, into which it is forced in the reactionary movement of the wings in the direction of the arrow $n^2$. The regulator-block is regulated from the exterior of the casing by loosening the nut $r'$, grasping the hub-portion of the dial $r$ and turning the screw $q$ until the shock absorber opposes the desired resistance to the reactionary movement of the body. When the block is thus adjusted, the nut $r'$ is tightened, clamping the screw and the dial tightly in place, and the indication expressed by the index $r$ can be noted, to express the proper adjustment of the regulator-block jolting in a certain degree corresponding to rough roads, smooth roads, or roads of intermediate quality.

Each of the constructive features possesses a certain utility in the construction or operation of this device; the formation of the casing with a cylinder and cover both stamped of sheet-metal permits the accurate production of the required shape with much less machine-work than is needed if castings be employed. The cylindrical box would, however, be turned upon its inside and the cover would be rabbeted near the margin, as shown at $v$ to hold it centrally within the casing, and may be recessed at $v'$ for ornamental effect when turning out and threading the socket for the gland $h'$. The fastening of the abutments A by the screws B and B' secures both the head $d$ and the cover $f$ to the flat edges of the abutments, and thus resists effectively the liquid pressure against such head and cover.

The arrangement of the piston between the port-holes at different points in the length of the spindle permits the piston to oscillate without opposing any resistance to the wings $n$ when the vehicle is running upon smooth roads, as any resistance of the absorber to the slight vibration of the vehicle-body at such times would only impair the easy riding of the body.

The provision of the regulator to limit the movement of the piston in one direction enables the resistance during the reactionary movement to be graduated in exactly the desired degree, and the dial movable with the regulator-screw permits the adjustment to be recorded for reproduction at any future time under similar conditions.

The formation of the screw $q$ to pass through the foot of the guide $s$ and through the center of the dial $r$, enables the nut $r'$ to clamp all three parts firmly in position when the regulator is adjusted, such clamping also preventing leakage. The use of a complete circular dial instead of an index arm or finger avoids all the accidents which are liable to happen to a slender projecting part like a finger. The dial has a cylindrical hub fitted over the bearing-socket $d^2$, by which hub it can be readily grasped for adjusting the regulator-block, but such hub and the edges of the dial lie close to the head $d$ so that they are free from any derangement to which a projecting arm would be liable.

The provision of the piston, and its automatic relation to the ports $e$ and $e'$ and the regulator-block, avoids the use of any valves in the wings, with all the expense attendant to the construction and fitting of the valves thereto, and the expense is therefore reduced while the operation of the device is rendered more simple and reliable.

The relation of the piston to the four port-holes, two being the inlet from one side of the wing and the others the outlet to the opposite side of the wing, permits the arms of the shock absorber to vibrate a limited distance without any resistance, but automatically furnishes the desired resistance to the reacting movements of the vehicle-body, when such limit is exceeded, and this range of free movement can be readily increased by changing the length of the springs $o$ and $o'$ so as to hold the piston normally nearer to the port-holes $e'$. The piston then stands farther from the port-holes $e$, whose closure furnishes the resistance to the wings, and would oscillate farther when moved by the wings before bringing the resistance into automatic operation. The distance that the wings may thus vibrate idly or without resistance is governed by the internal capacity of the bore $k$, which is proportioned to receive an amount of the liquid displaced by the vibration of the wing when the arms of the absorber are moved the permissible distance without resistance. The capacity of the bore between the ports $e$ and $e'$ is therefore made in the desired proportion to the capacity of the chamber during the idle oscillation of the wings. Such capacity being a maximum of the piston-movement, any lesser movement may be effected by proportioning the springs $o$ and $o'$ to hold the piston normally nearer to or farther from the ports $e$. The proportions of the parts can thus be varied in the construction so as to suit different conditions under which the absorber may be used.

Having thus set forth the nature of the invention what is claimed herein is:

1. In a shock absorber, the combination, with the casing having abutments therein, of a hollow spindle having wings movable between the abutments and having ports extended into its bore from opposite sides of each wing, said ports being at different points in the length of the spindle, a piston movable in the bore between the two ports, and springs holding the piston normally between the ports and yielding with the pressure upon the liquid when pressed between the wings and abutments.

2. In a shock absorber, the combination, with the cylindrical casing having abutments therein, of a hollow spindle having wings movable between the abutments and having ports extended into its bore from opposite sides of each wing, said ports being at different points in the length of the spindle, a piston movable in the bore between the two ports, springs holding the piston normally between the ports, and a regulator-block adjustable in the bore adjacent to the piston whereby the piston first yields under the pressure of the liquid, and finally restricts the passage of the liquid past the wings.

3. In a shock absorber, the combination, with the casing having abutments therein, of a hollow spindle having wings movable between the abutments and having ports extended into its bore from opposite sides of each wing, said ports being at different points in the length of the spindle, a piston movable in the bore between the two ports, springs holding the piston normally between the ports, and a regulator to vary the movement of the piston under the pressure of the liquid.

4. In a shock absorber, the combination, with the casing having abutments therein, of a hollow spindle having wings movable between the abutments and having ports extended into its bore from opposite sides of each wing, said ports being at different points in the length of the spindle, a piston movable in the bore between the two ports, and springs holding the piston normally between the ports, a regulator-block movable longitudinally in the bore to regulate the stroke of the piston, a screw fitted to the said block to adjust the same and having a shank extended through the wall of the casing, and an index-dial movable with such shank to indicate the adjustment of the screw, and serving also as a means to turn the screw.

5. In a shock absorber, the combination, with the casing having abutments therein, of a hollow spindle having wings movable between the abutments and having ports extended into its bore from opposite sides of each wing, said ports being at different points in the length of the spindle, a piston movable in the bore between the two ports, and springs holding the piston normally between the ports, a threaded regulator-block movable longitudinally in the bore, guides attached to the head of the casing to hold such block from turning, a screw fitted to the thread in the block and having a shank extended through the wall of the casing and threaded and flattened upon its outer end, an index-dial fitted to the flattened portion of the shank with graduations upon its margin, an index upon the casing-head to set the dial, and a jam-nut upon the threaded portion of the shank adapted to clamp the dial to the casing-head when adjusted, and simultaneously lock the regulator-block in its adjusted position.

6. In a shock absorber, the combination, with the casing having abutments therein, of a hollow spindle having a bore at both ends with a partition intermediate the ends, of opposite wings upon the spindle and ports extended into the bore from opposite sides of each wing at different points in its length, a piston movable between the ports, and having a stem extended through the partition, and springs applied to the stem at opposite sides of the partition, to hold the piston in its balanced position.

7. In a shock absorber, the combination, with a casing having an integral cylinder and head with a recessed bearing in the center of the head, and a cap attached to the opposite end of the cylinder with a bearing in the center, of a hollow spindle rotatable in the said bearings and projected beyond the bearing in the cover and open at both ends with a partition intermediate its ends, wings upon its opposite sides and ports extended into the bore from opposite sides of each wing at different points in its length, a piston fitted to the bore between the ports and having a stem extended through the partition with springs at opposite sides thereof, a crank-arm fitted to the spindle outside its bearing, and a bolt closing the open end of the spindle and having a head to hold the crank-arm thereon.

In testimony whereof I have hereunto set my hand in the presence of two subscribing witnesses.

ADOLPH PETELER.

Witnesses:
L. LEE,
THOMAS S. CRANE.